United States Patent
Miyaki

(10) Patent No.: US 6,842,413 B2
(45) Date of Patent: Jan. 11, 2005

(54) METHOD OF CALCULATING WRITE CONDITION DETECTION INDEX AND OPTICAL DISK WRITING METHOD AND APPARATUS USING THE METHOD

(75) Inventor: Seiichiro Miyaki, Tokyo (JP)

(73) Assignee: NEC Corporation, Tokyo (JP)

(*) Notice: Subject to any disclaimer, the term of this patent is extended or adjusted under 35 U.S.C. 154(b) by 542 days.

(21) Appl. No.: 10/056,033

(22) Filed: Jan. 28, 2002

(65) Prior Publication Data
US 2002/0101806 A1 Aug. 1, 2002

(30) Foreign Application Priority Data
Jan. 26, 2001 (JP) .......................... 2001-018260

(51) Int. Cl.$^7$ .............................................. G11B 7/125
(52) U.S. Cl. ................ 369/47.53; 369/53.27; 369/53.22; 369/47.51; 369/53.11
(58) Field of Search ............................ 369/47.5, 47.51, 369/47.52, 47.53, 47.55, 53.11, 53.2, 53.22, 53.26, 53.27

(56) References Cited

FOREIGN PATENT DOCUMENTS

| JP | 9-91705 | 4/1997 | |
|---|---|---|---|
| JP | 09091705 A | * 4/1997 | ............ G11B/7/00 |
| JP | 9-270128 | 10/1997 | |
| JP | 2000-215454 | 8/2000 | |

* cited by examiner

Primary Examiner—Susan McFadden
Assistant Examiner—Jorge L. Ortiz-Criado
(74) Attorney, Agent, or Firm—Young & Thompson

(57) ABSTRACT

It is an object of the present invention to obtain a write condition detection index with improved stability for a variation in temperature and with improved detection sensitivity for a write condition so that the index can more appropriately follow a variation in write condition. A write pit reflected light level Sp and a write space reflected light level Ss are detected. On the basis of these detected values Sp and Ss and write power Pw1 with which laser beams from a semiconductor laser element exit an objective of an optical head during a write, an index Rm that is indicative of a write condition for an optical disk is determined using the equation $Rm=Sp/Ss/(Pw1)^2$. Then, on the basis of the write condition detection index Rm, the write power Pw1 is controlled.

24 Claims, 10 Drawing Sheets

METHOD OF CALCULATING WRITE CONDITION DETECTION INDEX AND OPTICAL DISK WRITING METHOD AND APPARATUS USING THE METHOD

BACKGROUND OF THE INVENTION

1. Field of the Invention

The present invention relates to a method of calculating a write condition detection index, the method determining an index used for detection of a write condition for an optical disk when information is written to the optical disk, as well as an optical disk writing method and apparatus using the above method.

2. Description of the Related Art

Parameters indicating a write condition for an optical disk include an "asymmetry value", indicating the degree of asymmetry of a RF (Radio Frequency) waveform obtained by reading a written waveform, and a "β value (β)".

If a data signal is to be written to an optical disk such as a CD-R, it is modulated using an EFM (Eight to Fourteen Modulation) method. With this method, nine time intervals that are each three to eleven times (other values may be used depending on the type of the disk) as long as a predetermined reference time interval T are provided as high- and low-level time intervals for a reference digital signal. FIGS. 8A, 8B and 8C show waveforms read from a disk to which information has been written in the above manner. FIG. 8A indicates that the amplitude has a large value when lands are long and that the amplitude is low when the lands have a length of 3T. Further, as shown in FIG. 8A, if the ground of a non-DC-cut (DC-coupled) HF signal is defined as a 0 level position, and the land and pit levels at 3T and the land and pit levels at 11T are defined as I3L and I3P, and I11L and I11P, respectively, then the asymmetry is expressed by the following equation.

$$\text{Asymmetry value} = \{(I3L+I3P)/2 - (I11L+I11P)/2\}/(I11L-I11P) \quad (6)$$

As shown in FIGS. 8A, 8B and 8C, the asymmetry value decreases with increasing write power, while increasing with decreasing write power.

The β value is the index that indicates the degree of asymmetry of a waveform written to an optical disk. For the RF waveform shown in FIG. 8C and obtained by reading the written waveform, if the AC-ground of a DC-cut (AC-coupled) HF signal is defined as a 0 level and the land- and pit-side levels of the HF signal envelope are defined as A1 and A2, then the β is expressed by the following equation:

$$\beta\ \text{value} = (A1+A2)/(A1-A2) \quad (7)$$

As shown in FIGS. 8A, 8B and 8C, in contrast to the asymmetry value, the β value increases consistently with write power, while decreasing consistently with write power.

The β value (or asymmetry value. These will be interchangeably used below) and jitters have the relationship shown in FIG. 9. If the β value is excessively large or small, jitters are likely to become worse. The range of the β value corresponding to tolerable jitter values is generally called a "power margin". The power margin varies depending on the type of the optical disk. In particular, optical disks with narrow power margins have their β value vary significantly, and thus need to have such a write condition that the β value is stable and uniform all over the surface of the optical disk. In recent years, a high-double-speed write technique has been popularized, and such a technique tends to involve a much narrower power margin. Thus, it has recently been more desirable to establish such a write condition that the β value is stable and uniform all over the surface of the optical disk.

Under these circumstances, a normal method of writing information to an optical disk comprises calibrating optimum write power (this operation will hereinafter be referred to as "OPC") in a predetermined power calibration area (this will hereinafter be referred to as a "PCA") and then actually writing information to a data write area with the fixed optimum write power determined by OPC.

However, due to the causes listed below, the write condition for the optical disk may not be optimum in spite of the optimum power determined by the OPC.

1) Variation in the characteristics of the optical disk depending on a position within the surface of the disk.
2) Variation in the offset between the optical axis of a laser beam from an optical head and the mechanical inclination of the write surface of the optical disk, depending on a position in the surface of the disk. This is due to a variation in radial skew within the surface, the warp of the disk, or the like. The term "radial skew" refers to the angle between the optical axis of the optical pickup in its radial direction and the normal of the optical disk.
3) Variation in the characteristics of the optical disk caused by a variation in temperature between OPC and actual writes.
4) Variation in write characteristics caused by a variation in the wavelength of a semiconductor laser element associated with a variation in temperature between OPC and actual writes.

To solve these problems, an operation may be performed which comprises detecting the write condition during a write using various methods, correcting the write power on the basis of the detected conditions, and maintaining the write condition established during the OPC (this operation is generally referred to as "running OPC").

For example, the techniques disclosed in Japanese Patent Application Laid-Open No. 2000-215454 (hereinafter referred to as a "first conventional example"), Japanese Patent Application Laid-Open No. 9-270128 (hereinafter referred to as a "second conventional example"), and Japanese Patent Application Laid-Open No. 9-91705 (hereinafter referred to as a "third conventional example") are known as running OPC.

In the first conventional example, on the basis of the peak value of the level of write pit reflected light (this will hereinafter be referred to as a "peak value") and the sampling hold level of the latter half of the write pit reflected light (this will hereinafter be referred to as a "B value"), the write condition is detected using the following equation, to correct the write power:

$$\text{Write condition detection index} = (B\ \text{value})/(\text{peak value}) \quad (11)$$

That is, during OPC, the write condition detection index is measured on the basis of the above equation and used as a write condition detection index target value. Further, the write power is controlled so that the write condition detection index measured during a write to a data write area equals the target value.

In the second conventional example, on the basis of the peak value and the B value, the write condition is detected using the following equation, to correct the write power:

$$\text{Write condition detection index} = (\text{peak value})/N - (B\ \text{value}) \quad (12)$$

where N is an experimental value determined for each type of optical disk.

In the third conventional example, the peak value is not used as an operational parameter in contrast to the first and second conventional examples. That is, on the basis of the level of write pit reflected light and the write power, the write condition is detected using the following equation, to correct the write power:

Write condition detection index=(write pit reflected light level)/(write power)  (13)

That is, the write condition detection index is measured at the start of a write to a data write area on the basis of the above equation and used as a write condition detection index target value. Further, the write power is controlled so that the write condition detection indices measured during subsequent writes to data write areas equal the target value.

However, the first to third conventional examples have the following problems:

In the first and second conventional examples, the peak value included in both Equations (11) and (12) is drastically affected by the frequency characteristics of a reflected light detecting circuit, and the frequency characteristics vary even with temperature. Thus, it is difficult to stably measure the peak value. Further, a peak hold circuit is required to obtain a peak value, thereby increasing circuit costs. Furthermore, due to various factors, a variation in write condition cannot be properly followed by using the method of controlling the write power on the basis of the write condition detection index obtained using Equations (11) and (12). Furthermore, for certain types of optical disks, the write condition detection index cannot be properly detected.

In the second conventional example, the value N included in Equation (12) is given for each type of optical disk, so that this method cannot deal with many types of optical disks easily. Furthermore, different optical write devices have different Ns, so that this example is not suited for mass production.

In the third conventional example, the write condition detection index determined using Equation (13) exhibits a small variation with respect to the write power for some types of optical disks and thus has low detection sensitivity. Accordingly, it is difficult to increase the accuracy of running OPC. Further, due to various factors, a variation in write condition cannot be properly followed by using the method of controlling the write power on the basis of the write condition detection index obtained using Equation (13).

FIG. 10 is a graph showing the results of running OPC according to the third conventional example. If information is written to the entire surface of the optical disk with the write power fixed, that is, without running OPC, the β value is about 10% smaller at the outer circumference of the disk than at the inner circumference thereof. If running OPC is executed on this optical disk to write information to the entire surface, the β value is about 5% larger at the outer circumference of the disk than at the inner circumference thereof. The results of the experiments indicate that running OPC improved the variation in β value from −10% only to +5%. However, the ideal variation is 0%.

SUMMARY OF THE INVENTION

It is thus an object of the present invention to provide a method of calculating a write condition detection index with improved stability for a variation in temperature or the like and with improved detection sensitivity for the write condition, as well as an optical disk writing method and apparatus using the above method.

A method of calculating a write condition detection index according to the present invention determines an index Rm that is indicative of a write condition for an optical disk when information is written to the optical disk. That is, a stable-intensity portion of light reflected when the disk is irradiated with laser beams with power Pw1 that is sufficient to generate pit portions is detected as a light intensity level Sp, the intensity of light reflected from a space portion when the disk is irradiated with laser beams with power that is insufficient to generate pit portions is detected as a light intensity level Ss, and the index Rm is determined using the equation $$Rm=Sp/Ss/(Pw1)^2 \qquad (1).$$

Alternatively, a stable-intensity portion of light reflected when the disk is irradiated with laser beams with power Pw1 that is sufficient to generate pit portions is detected as a light intensity level Sp, and the index Rm is determined using the equation $$Rm=Sp/(Pw1)^2 \qquad (2).$$

The peak value of the intensity of light reflected when the disk is irradiated with laser beams with the power Pw1 is not used, thereby providing a stable write condition detection index that is not affected by a variation in temperature or the like. Further, the use of the power $(Pw1)^2$ increases a variation with respect to the write power, thereby providing a write condition detection index with improved detection sensitivity for the write condition.

In this case, the index Rm is determined for at least one circumference of the optical disk, and these indices Rm are averaged to obtain a true index Rm. Alternatively, for each of the Sp, Ss, and Pw1, the measured values are averaged, and using the average values obtained, the index Rm is calculated. In these cases, the write condition detection index is more accurate.

An optical disk writing method according to the present invention comprises using the method of calculating a write condition detection index according to the present invention to measure the index Rm whenever information is written to the optical disk and controlling the power Pw1 so as to minimize a difference between the index Rm and a target value thereof.

In this case, the target value maybe the index Rm measured during OPC, measured when calibration is executed in the PCA with optimum write power, or measured immediately after the start of a write to a data write area, using the method of calculating a write condition detection index according to the present invention.

An optical disk write apparatus according to the present invention determines an index Rm that is indicative of a write condition for an optical disk in writing information to the optical disk and controls power Pw1 that is sufficient to generate pit portions so as to minimize a difference between the index Rm and a target value thereof. That is, this apparatus comprises means for detecting, as a light intensity level Sp, a stable-intensity portion of light reflected when the disk is irradiated with laser beams with the power Pw1, means for detecting, as a light intensity level Ss, the intensity of light reflected from a space portion when the disk is irradiated with laser beams with power that is insufficient to generate pit portions, means for determining the index Rm using the equation $$Rm=Sp/Ss/(Pw1)^2 \qquad (1),$$

and means for controlling the power Pw1 so as to minimize a difference between the index Rm and the target value thereof. Alternatively, the apparatus comprises means for detecting, as a light intensity level Sp, a stable-intensity portion of light reflected when the disk is irradiated with laser beams with the power Pw1, means for determining the index Rm using the equation $$Rm = Sp/(Pw1)^2 \qquad (2),$$

and means for controlling the power Pw1 so as to minimize a difference between the index Rm and the target value thereof.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIGS. 8A to 8C are graphs useful in describing an asymmetry value and a β value, wherein FIG. 8A is a graph with high write power, FIG. 8B is a graph with intermediate write power, and FIG. 8C is a graph with low write power;

DESCRIPTION OF THE PREFERRED EMBODIMENTS

Figure 1:
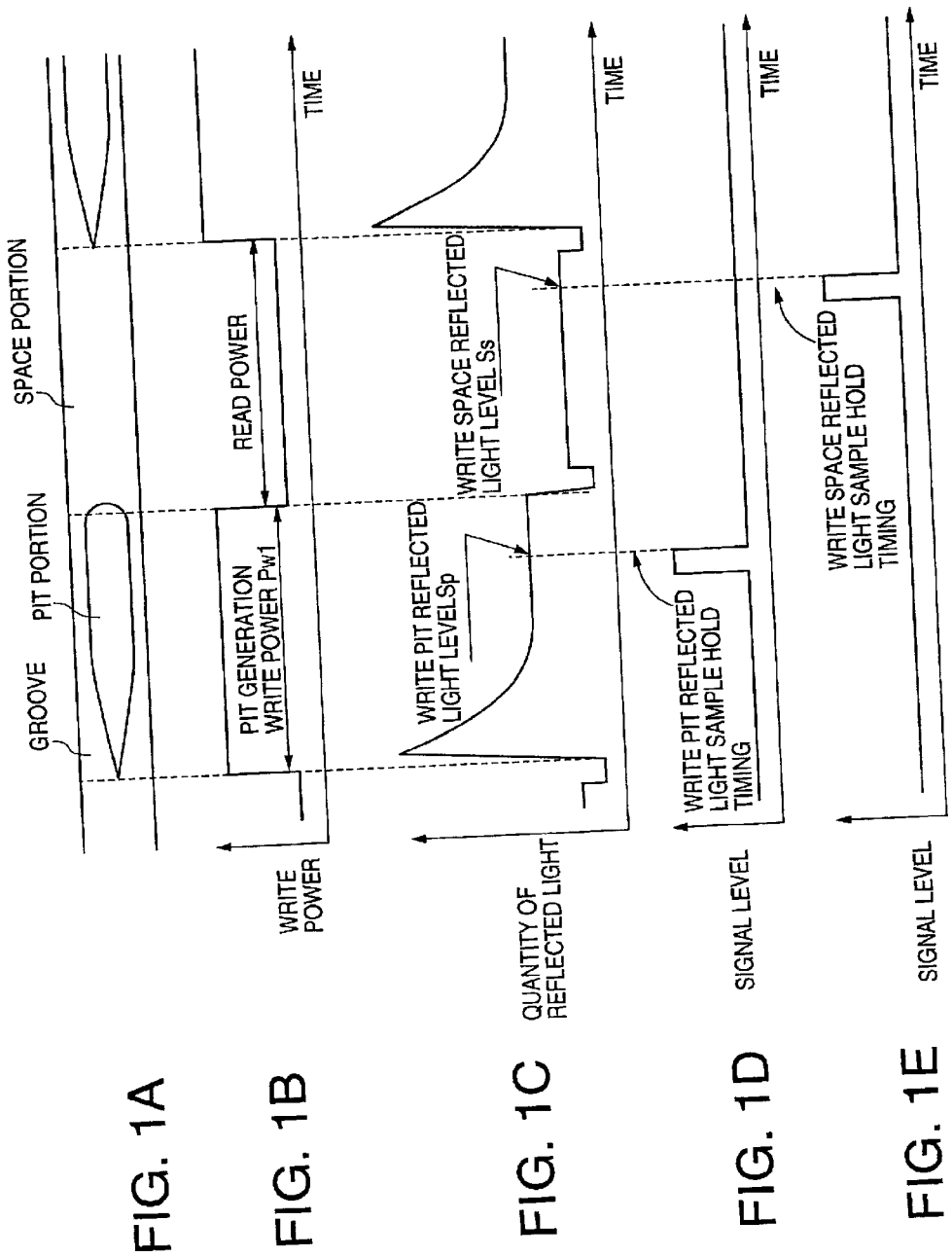
FIG. 1A to 1E are a view useful in describing an embodiment of a method of calculating a write condition detection index according to the present invention.

FIG. 1 is a view useful in describing an embodiment of a method of calculating a write condition detection index according to the present invention. With reference to this drawing, the embodiment will be described below.

First, two levels are detected: a level obtained by sampling and holding the latter half of light reflected from an optical disk when information is written to the disk with write power that is sufficient to generate pits (this will hereinafter be referred to as a "write pit reflected light level Sp"), and a level obtained by sampling and holding light reflected from a space portion of the optical disk when information is written to the disk with read power that is insufficient to generate pits (this will hereinafter be referred to as a "write space reflected light level Ss") Then, an index that is indicative of the write condition for the optical disk is determined from these detected values Sp and Ss and write power Pw1 with which a laser beam from a semiconductor laser element exits an objective of an optical head during a write, using the following equation:

$$\text{(write condition detection index } Rm\text{)} = \text{(write pit reflected light level } Sp\text{)}/\text{(write space reflected light level } Ss\text{)}/\text{(write power } Pw1)^2 \qquad (1)$$

The write power is controlled on the basis of the write condition detection index Rm.

Alternatively, to simplify the circuit, the write condition detection index Rm can be determined using the following equation, which does not use the write space reflected light level Ss:

$$\text{(write condition detection index } Rm\text{)} = \text{(write pit reflected light level } Sp\text{)}/\text{(write power } Pw1)^2 \qquad (2)$$

Before an actual write to a data write area, an operation (OPC) of calibrating optimum write power Pw0 is performed in a predetermined PCA in the optical disk. Further, during a write with optimum power Pw0, the write condition detection index Rm is measured using Equation (1) or (2). This write condition detection index is stored as a write condition detection index target value Rt, and the write power Pw1 is controlled so as to minimize a write condition detection index error ΔRm, that is, a difference between the write condition detection index Rm measured during a subsequent actual write to the data area and its target value Rt. An operation of thus controlling the write power while detecting the write condition is referred to as "running OPC".

Without running OPC, information is written to the data area with the fixed optimum write power already determined by OPC, so that this optimum write power is not always optimum due to various factors. As a result, the write condition may vary to degrade write quality. A "variation in write condition" as used herein refers to a variation in the asymmetry of a waveform obtained by reading a written waveform. The asymmetry is represented as an asymmetry value or a β value as described previously.

Figure 2:
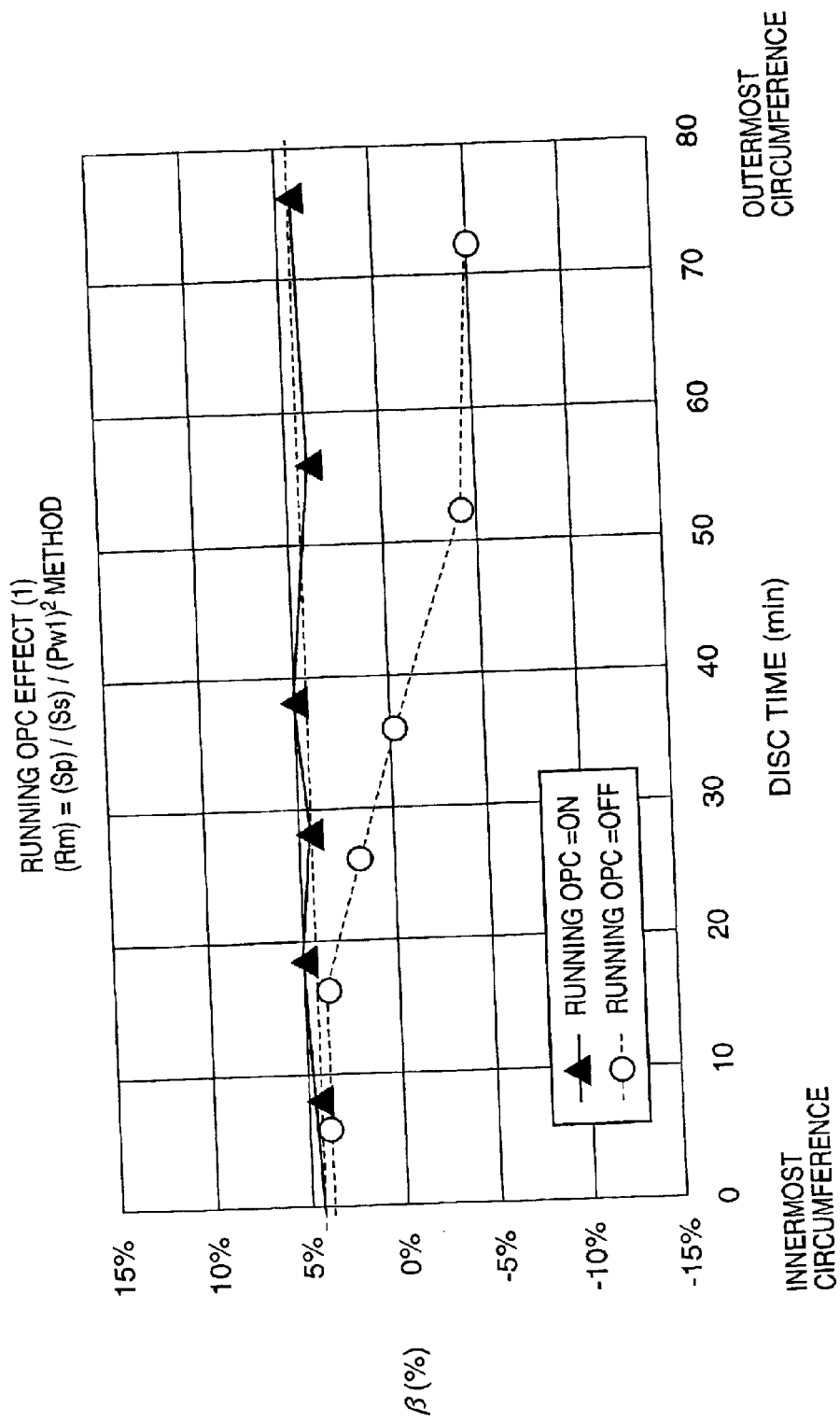
FIG. 2 is a graph showing the results of running OPC according to the present invention.

In this embodiment, if information is written using a running OPC control method, this operation can be performed while maintaining a stable write condition (that is, a stable asymmetry or β value) with the optimum write power Pw0 determined by OPC as shown in FIG. 2. Thus, stable write quality (that is, a uniform asymmetry or β value) can be realized all over the surface of the optical disk.

Figure 3:
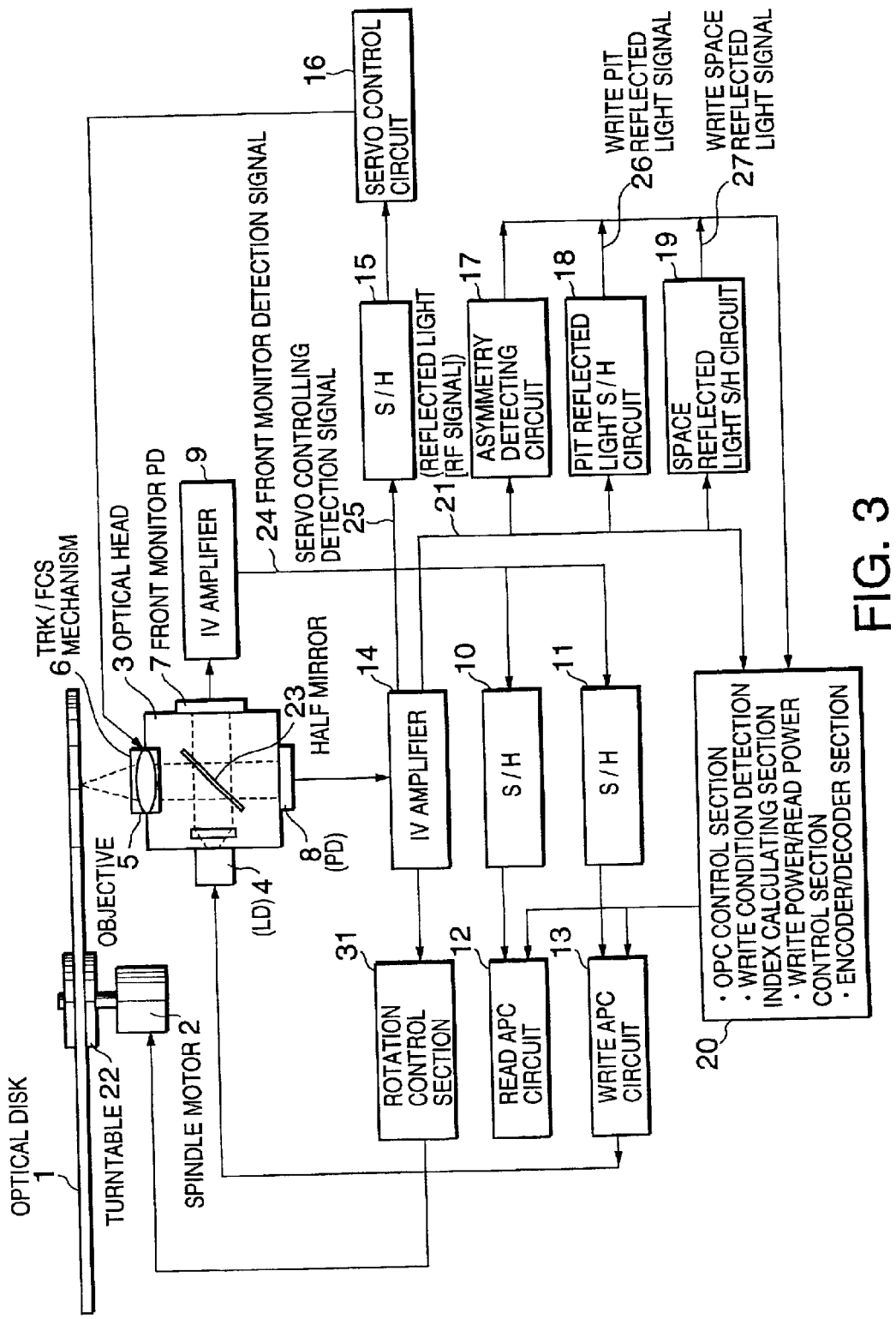
FIG. 3 is a block diagram showing an embodiment of an optical disk write apparatus according to the present invention.

FIG. 3 is a block diagram showing an embodiment of an optical disk write apparatus according to the present invention. With reference to this drawing, the optical disk write apparatus will be described below. At the same time, an optical disk writing method will be described.

An optical disk 1 is installed on a turntable 22 rotated by a spindle motor 2, and an optical head 3 reads and writes data from and to the optical disk 1. Laser beams output from a semiconductor laser element 4 in the optical head 3 are reflected by a half mirror 23 and then pass through an objective 5 to focus on the optical disk 1. Laser beam reflected light from the optical disk 1 returns to the optical head 3 and has its quantity of light detected by a signal-detecting photo detector 8 that is divided into a plurality of pieces. The light is then converted into voltage signals by a current-voltage converting amplifier 14, and these voltage signals are supplied to the respective blocks. Of the plurality of voltage signals, a sum signal for a main beam is used as a RF signal 21 to read out a written waveform from the optical disk 1 or detect the write condition during a write.

Further, a matrix of the plurality of voltage signals obtained by the current-voltage converting amplifier 14 becomes a servo controlling detection signal 25. The servo controlling detection signal 25 controls a focus mechanism that focuses laser beams on the optical disk 1 and a tracking mechanism that causes a laser beam spot to follow a track on the optical disk 1.

When data is written to the optical disk 1, the disk is irradiated with laser beams alternately with write power and read power (FIG. 1B) in order to generate pits on the optical disk 1. To achieve this, only the voltage signals resulting from light reflected upon irradiation with the read power are held as servo control signals by a sample hold circuit 15. The servo control signals are processed by a servo control circuit 16 to drive a tracking/focus mechanism 6 of the optical head 3 to control the objective 5, thereby servo-controlling the laser beam spot to a predetermined position on the optical disk 1. Further, although not shown, a thread mechanism is provided which moves the optical head 3 toward the inner or outer circumference of the optical disk. The thread mechanism allows the laser beam spot to roughly follow the track.

On the other hand, a front monitor light-receiving element 7 is irradiated directly with some of the laser beams output from the semiconductor laser element 4 which are transmitted through the half mirror 23. Thus, the intensity of laser beams from the semiconductor laser element 4 is converted into a voltage signal (front monitor detection signal 24) by a current-voltage converting amplifier 9. The front monitor detection signal 24 is used for auto power control (hereinafter referred to as "APC") that maintains the laser beam intensity at a set value.

During a write to the optical disk, laser beams are emitted alternately with the write power and the read power in order to generate pits on the optical disk 1. Thus, front monitor detection signals 24 obtained at the moment when the disk is irradiated with laser beams with the read power or the write power are held by sample hold circuits 10 and 11 and input to a read APC circuit 12 and a write APC circuit 13, respectively. The APC circuits 12 and 13 have their emitted power target values set by a write power/read power control section 20 to control APC on the basis of each sample and hold signal from the front monitor detection signal 24 so that the laser beam intensity equals this set power.

Then, during a read, the reflected light voltage signal 21 from the optical disk 1 is input to an asymmetry detecting circuit 17. As a result, an asymmetry or β value, which is indicative of the asymmetry of a read waveform, is detected.

The reflected light voltage signal 21 from the optical disk 1 is also input to a pit reflected light sample hold circuit 18, and has a waveform such as the one shown in FIG. 1C during a write. The pit reflected light sample hold circuit 18 samples and holds, as a write pit reflected light signal 26, the latter half of the reflected light voltage signal 21 obtained when the disk is irradiated with the write power; this portion has a stable reflected light level due to saturated pit generation.

Likewise, the reflected light voltage signal 21 is input to a space reflected light sample hold circuit 19, and has a waveform such as the one shown in FIG. 1C during a write. The space reflected light sample hold circuit 19 samples and holds, as a write space reflected light signal 27, a stable-reflected-light-level portion of the reflected light voltage signal 21 obtained when the disk is irradiated with the read power.

The write pit reflected light signal 26 and the write space reflected light signal 27 are input to a write condition detection index calculating section 20. The write condition detection index calculating section 20 determines the "write condition detection index". On the basis of this write condition detection index, the write power is controlled and running OPC is executed.

FIGS. 4 to 7 are flow charts showing examples of the operation of the optical disk write apparatus of this embodiment. These examples will be described with reference to FIGS. 1 to 7.

Figure 4:
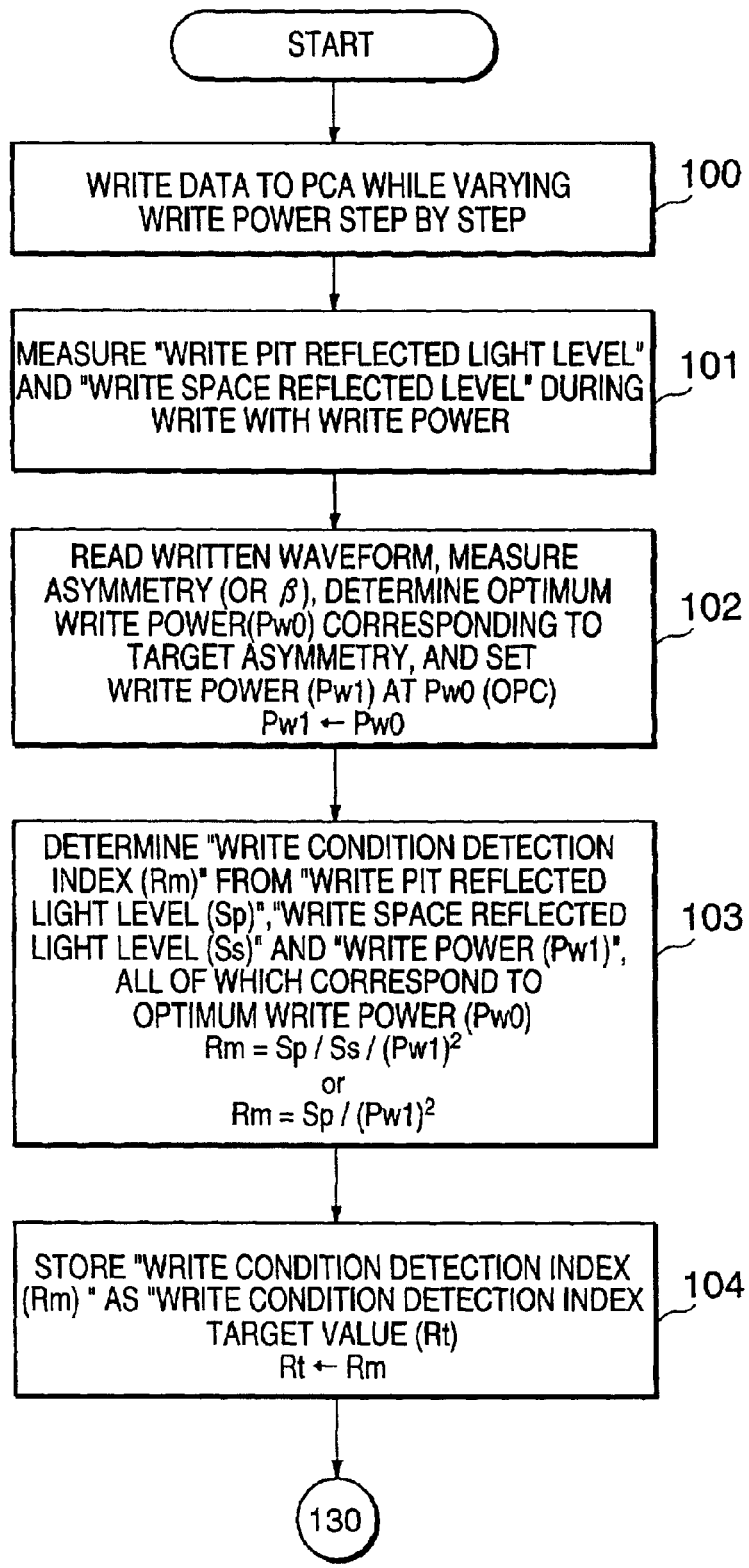
FIG. 4 is a flow chart showing an example of the operation of the optical disk write apparatus in FIG. 3.

First, as shown in FIG. 4, before an actual write to a data area, an operation (OPC) of calibrating the optimum write power Pw0 is performed in a predetermined PCA of the optical disk 1.

That is, the write power control section 20 writes data while varying the write power step by step (step 100). The resulting waveform is read out, and the asymmetry detecting circuit 17 measures the asymmetry (or β) corresponding to each write power. This provides a graph of a curve representative of write power vs. asymmetry (or β). By linearly approximating the measured values on the curve, the write power Pw0 corresponding to a target asymmetry (or target β) predetermined for each disk 1 is mathematically determined as optimum write power. The write power Pw1 is set as this optimum write power Pw0 (step 102). Simultaneously with this write operation, the pit reflected light sample hold circuit 18 and the space reflected light sample hold circuit 19 measure and store the write pit reflected light level Sp and write space reflected light level Ss (step 101).

Figure 9:
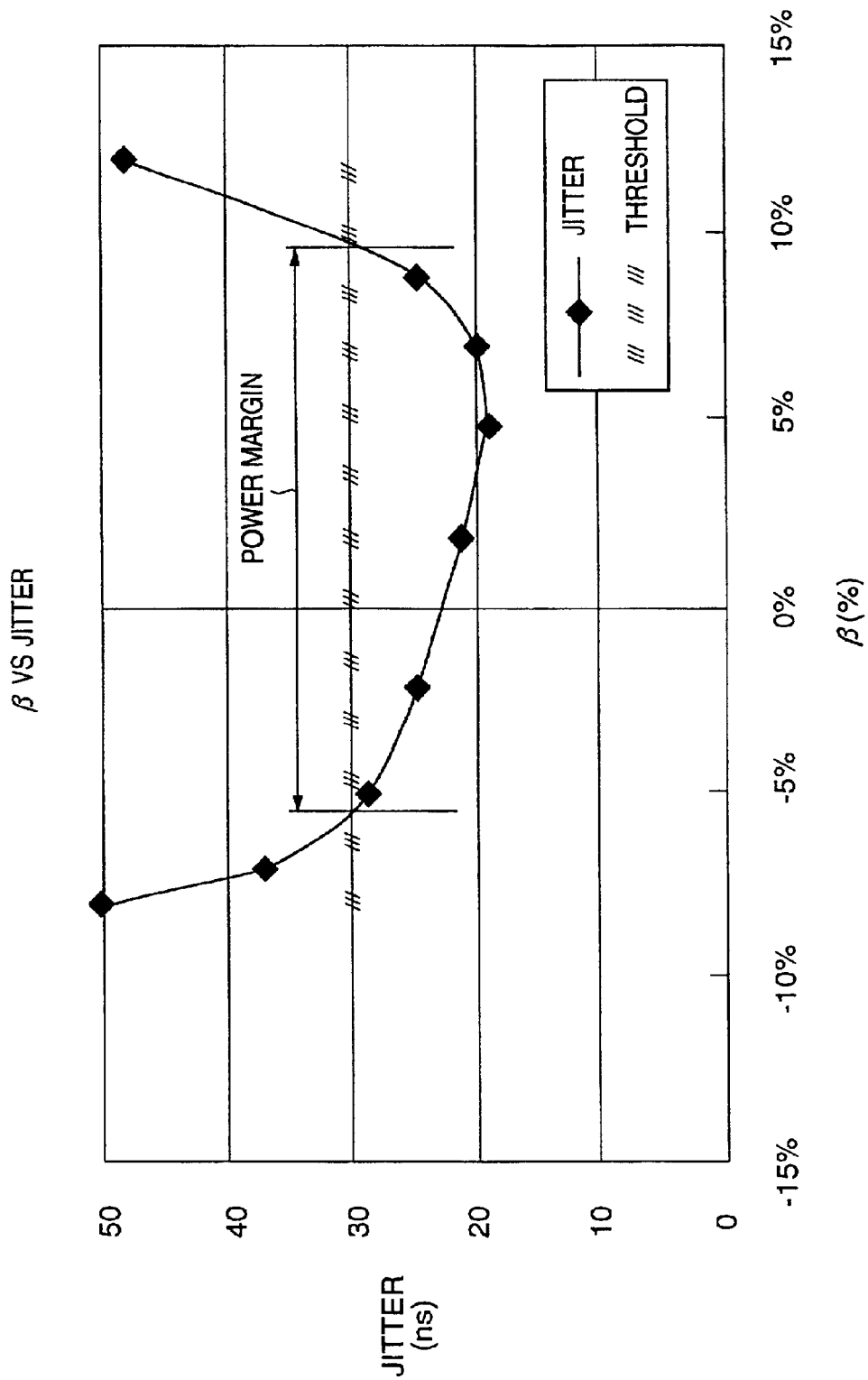
FIG. 9 is a graph showing an example of the relationship between the β value and jitters.
Figure 10:
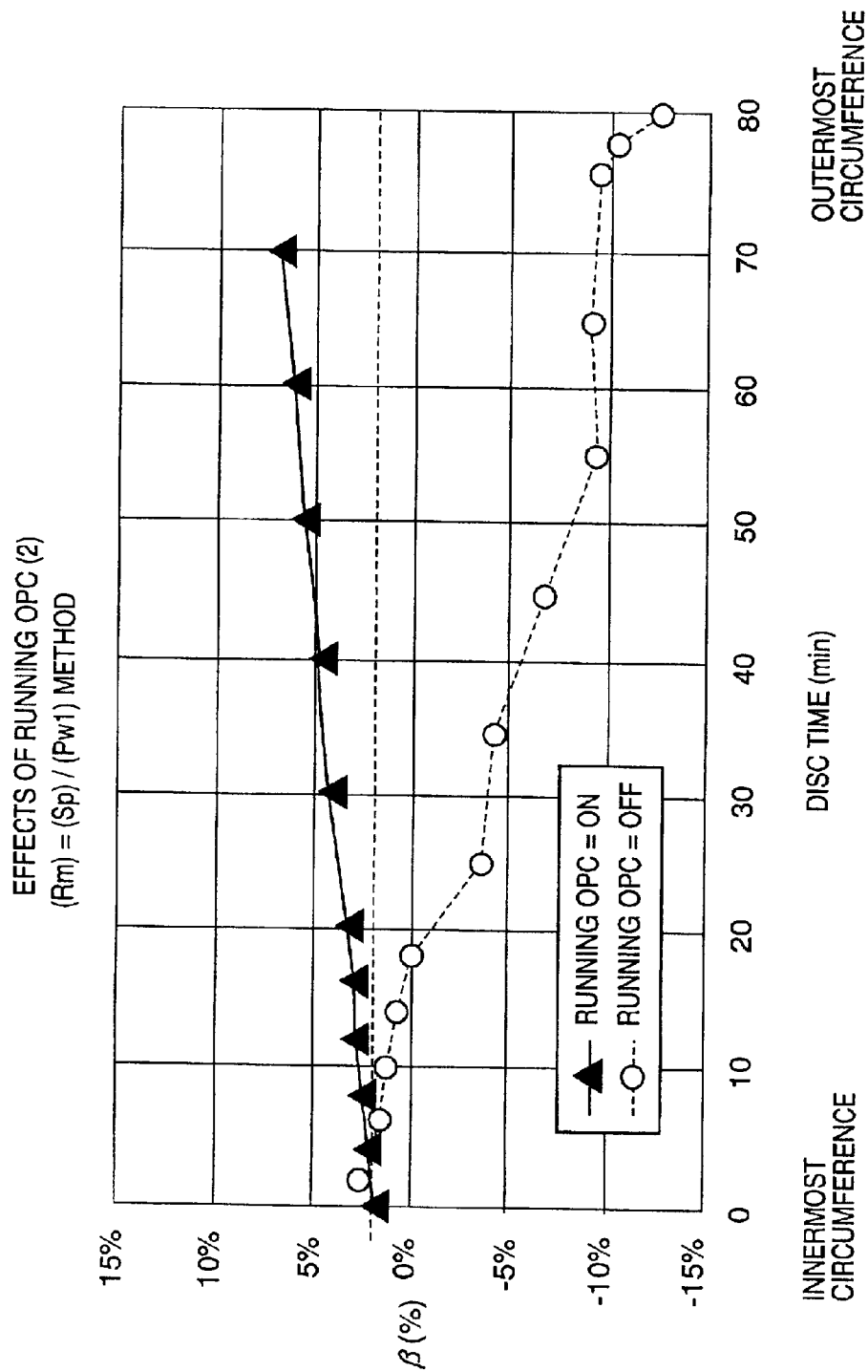
FIG. 10 is a graph showing the results of running OPC according to a third conventional example.

An example of a manner of determining a target asymmetry (or target β) will be described below. Upon initializing the disk (medium), the optical disk apparatus reads data already written to the disk and called "special information" to identify a disk ID in the data, and executes a write using one of the strategies listed in a strategy table, described later, which corresponds to the disk ID and write speed and using the target asymmetry (β) corresponding to that strategy. As a target asymmetry, an asymmetry value is selected such that the range of power, that is, a power margin (see FIG. 9) is maximized for each strategy value when tolerable jitters are generated. The term "strategy" refers to time for which the disk is irradiated with laser beams with write power precisely set so as to most clearly write data to the disk. The strategy depends on the type of the disk and the write speed and thus exists for each disk type and each write speed. The strategies are provided in the OPC control section 20 as a strategy table. The manner of determining a target asymmetry is not limited to the above example, but may be another.

Timings for these detection signals are as shown in FIG. 1. During a write, the RF signal 21 has a waveform such as the one shown in FIG. 1C and has a low waveform level at the start of irradiation with the pit generation write power. Then, as pits are gradually formed, the quantity of reflected light gradually decreases. After a specified time, when the pit generation starts to be saturated, the signal level is also saturated and stabilized. The stable level of light reflected during the latter half of irradiation with the pit generation write power is sampled and held by the pit reflected light sample hold circuit 18 using the timing shown in FIG. 1D. This is set as a write pit reflected light level Sp. The waveform shown in FIG. 1B and obtained when data is written to the disk with the read power is sampled and held by the space reflected light sample hold circuit 19 as a write space reflected light level Ss.

On the basis of the detected values Sp and Ss measured in the above manner, the write condition detection index calculating section 20 uses Equation (1) or (2), shown below, to determine the write condition detection index Rm corresponding to the optimum write power Pw0 determined by OPC (step 103). This is stored as a write condition detection index target value Rt (step 104).

$$(\text{write condition detection index } Rm) = (\text{write pit reflected light level } Sp)/(\text{write space reflected light level } Ss)/(\text{write power } Pw1)^2 \quad (1)$$

$$(\text{write condition detection index } Rm) = (\text{write pit reflected light level } Sp)/(\text{write power } Pw1)^2 \quad (2)$$

With Equation (2), the write space reflected light level Ss is not used as an operational parameter, thereby eliminating the need for the space reflected light sample hold circuit 19. Thus, advantageously, circuit costs can be reduced, and loads on a detection circuit and an arithmetic circuit can be reduced during writes. However, disadvantageously, if the reflection factor of the optical disk 1 varies, an error may occur in the maintenance and control of the write condition.

Also in this case, the method of determining the write condition detection index Rm using Equation (1) serves to achieve better write characteristics. Equation (1) is effective if the reflection factor of the optical disk 1 varies. For example, it is more effective on optical disks having a reflection factor that varies with temperature.

Figure 5:
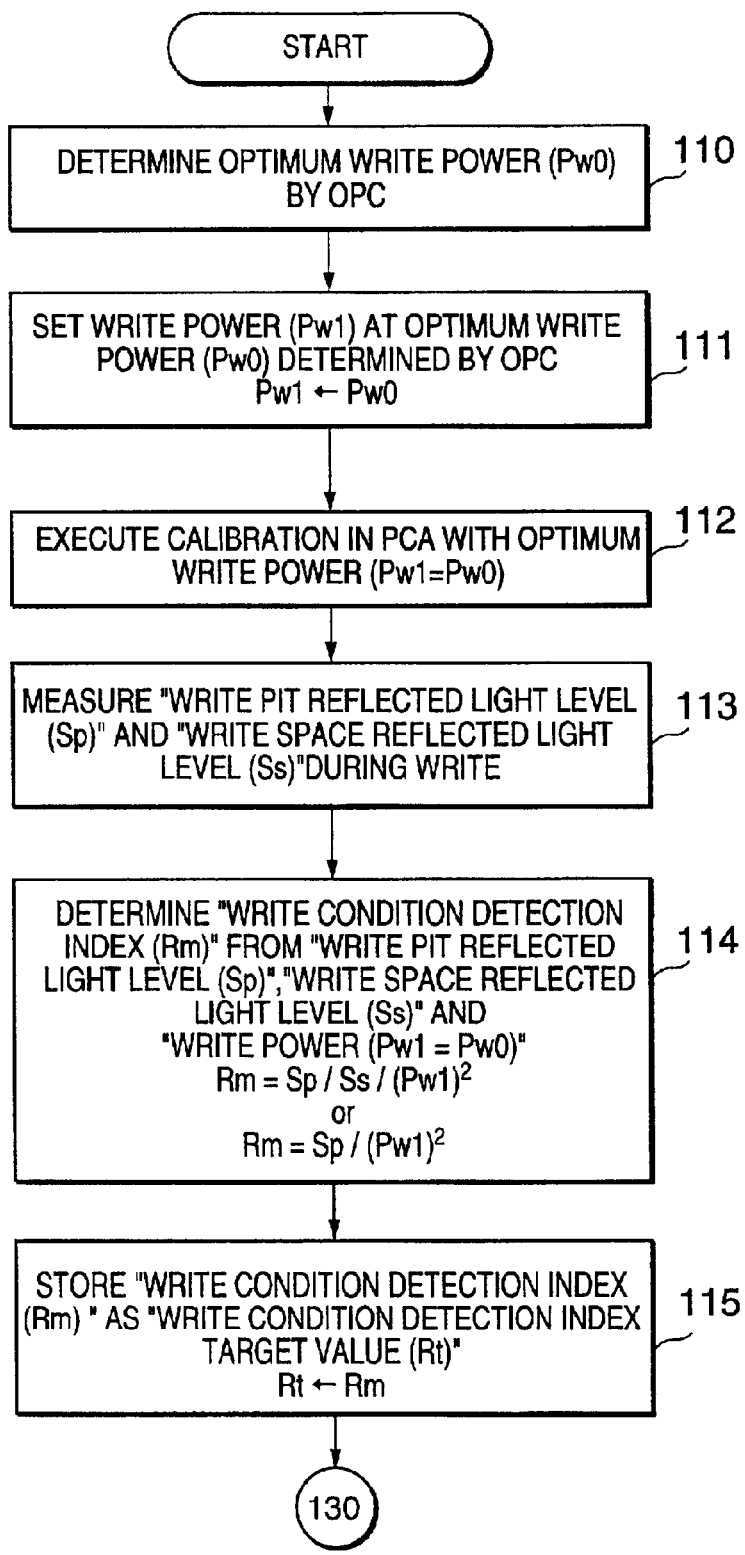
FIG. 5 is a flow chart showing an example of the operation of the optical disk write apparatus in FIG. 3.

FIG. 5 shows an alternative method of determining a write condition detection index target value Rt.

First, the optimum write power Pw0 is determined by OPC (step 110). This step is the same as steps 100 to 102 in FIG. 4. The write power Pw1 is set at this optimum write power Pw0 (step 111), and data is written to several frames of the PCA with the optimum write power (Pw1=Pw0) (step 112). Simultaneously with this write operation, the pit reflected light sample hold circuit 18 and the space reflected light sample hold circuit 19 measure the write pit reflected light level Sp and the write space reflected light level Ss (step 113), determine the write condition detection index Rm from the detected values using Equation (1) (or (2)) (step 114), and store it as a target value Rt (step 115).

Figure 6:
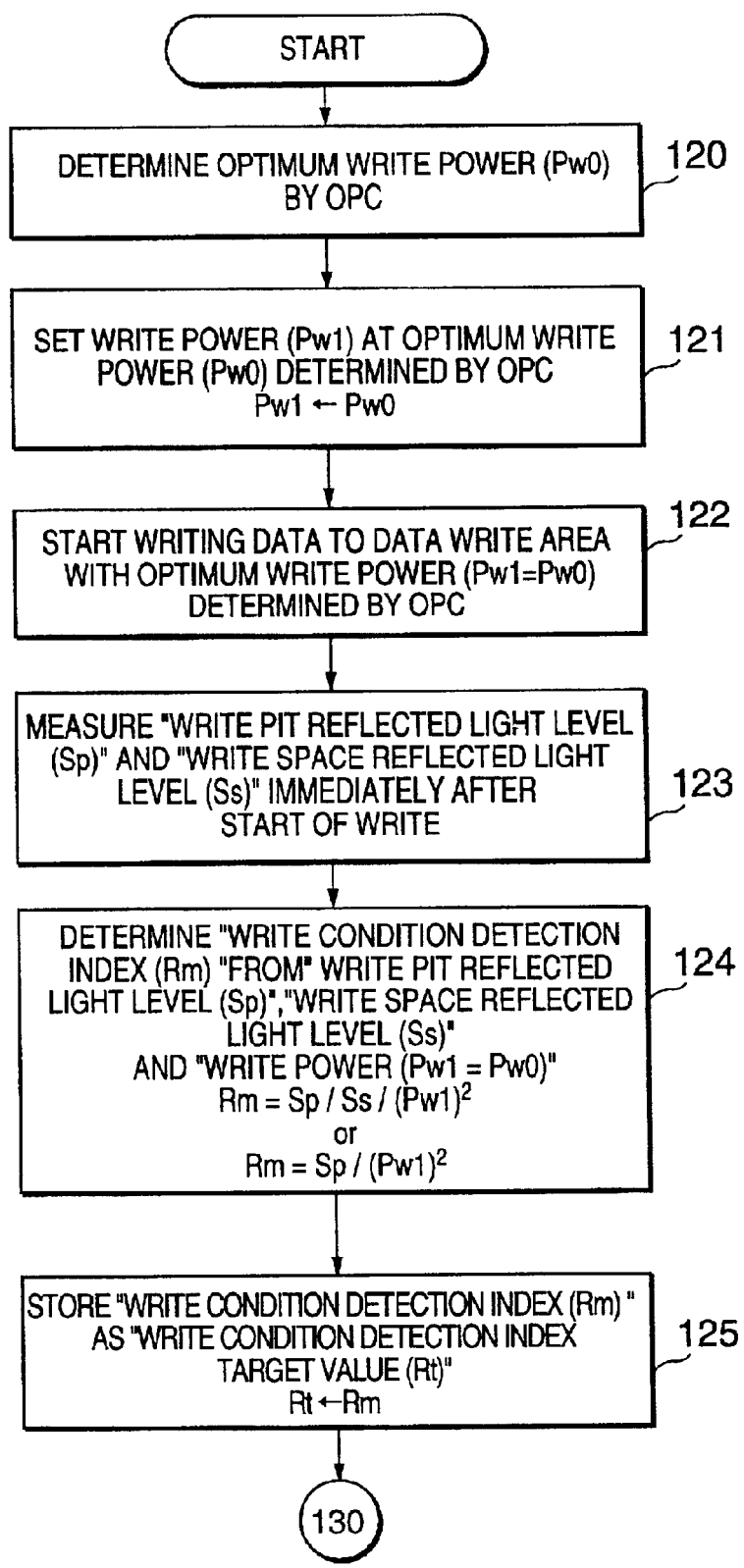
FIG. 6 is a flow chart showing an example of the operation of the optical disk write apparatus in FIG. 3.

FIG. 6 shows an alternative method of determining a target value Rt.

The optimum write power is determined by OPC (step 120), the write power Pw1 is set at this optimum write power Pw0 (step 121), and an actual write to the data write area is started with this write power (Pw1=Pw0) (step 122). Subsequently, the pit reflected light sample hold circuit 18 and the space reflected light sample hold circuit 19 measure the write pit reflected light level Sp and the write space reflected light level Ss (step 123), determine the write condition detection index Rm from the detected values using Equation (1) (or (2)) (step 124), and store it as a target value Rt (step 125).

Figure 7:
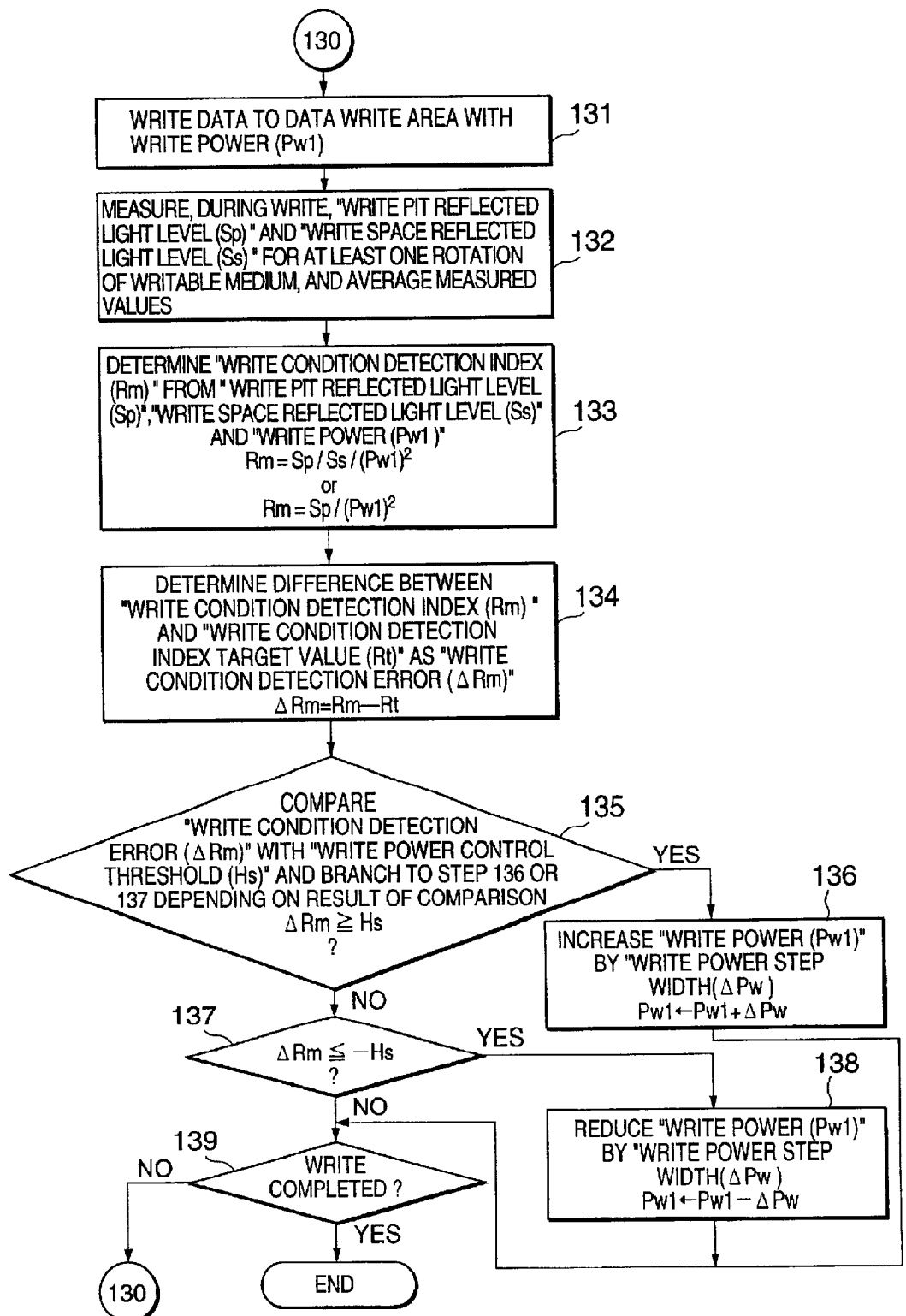
FIG. 7 is a flow chart showing an example of the operation of the optical disk write apparatus in FIG. 3.
Figure 8A:
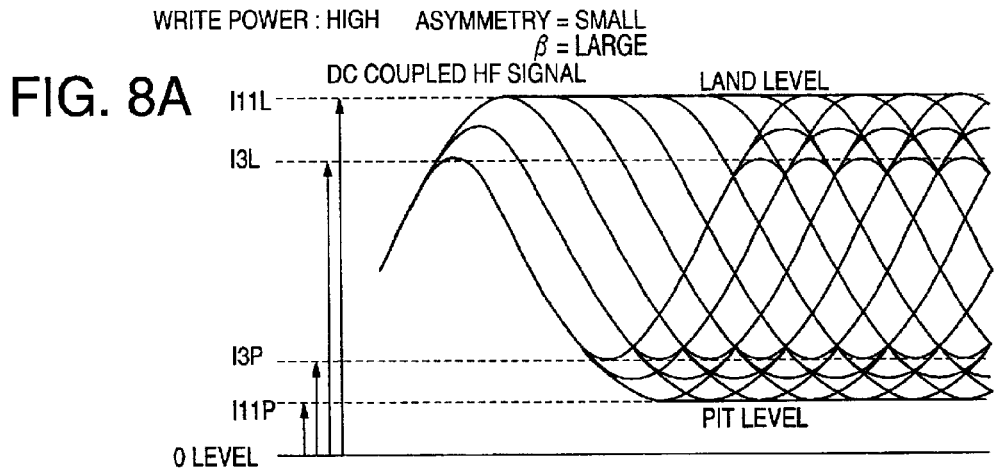
Figure 8B:
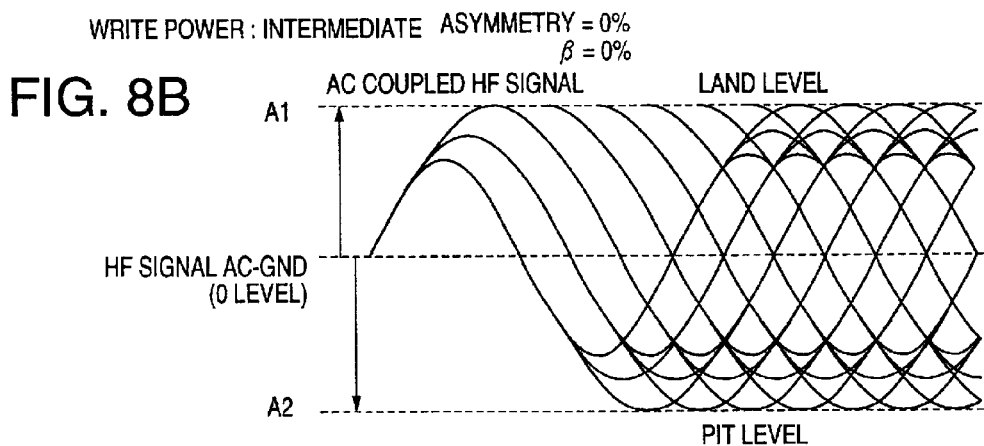
Figure 8C:
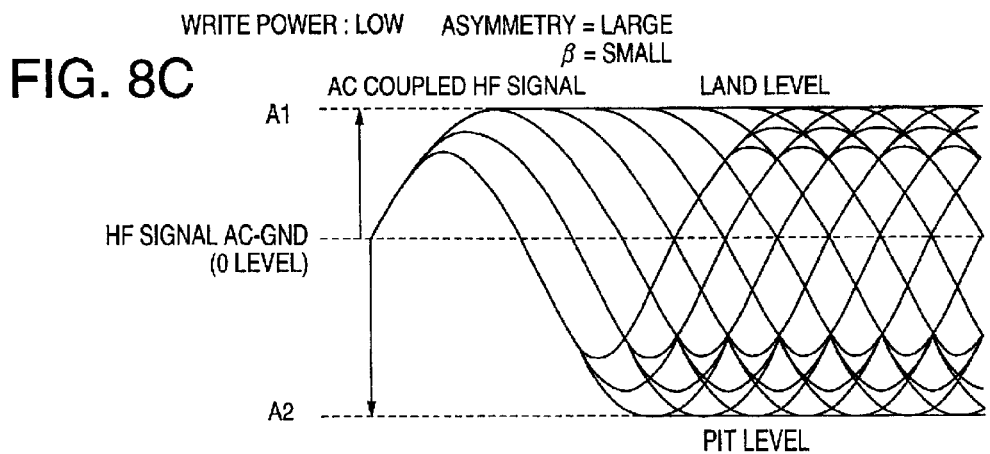

A target value Rt is determined in accordance with any of the flow charts of FIGS. 4 to 6, described previously. During a subsequent actual write to the data write area, the write power control (running OPC) shown in FIG. 7 is executed.

First, data is written to the data write area with the already set write power Pw1 (step 131). Then, the pit reflected light sample hold circuit 18 and the space reflected light sample hold circuit 19 sample and hold the waveform in FIG. 1B, and measure the write pit reflected light level Sp and the write space reflected light level Ss (step 132). At this time, measurement is carried out for at least one rotation of the disk in order to accommodate a variation in detected value associated with the rotation cycle of the optical disk, and the detected values are then averaged.

Subsequently, the write condition detection index calculating section 20 determines the write condition detection index Rm using Equation (1) (or (2)) (step 133). In FIG. 7, measurement is carried out for at least one rotation to obtain averaged Sp and Ss to determine the index Rm on the basis of the Sp and Ss, but the index Rm may be found for each of the measured Sp and Ss values so that these indices Rm can be averaged to obtain a write condition detection index Rm. Then, a difference between the write condition detection index Rm and its target value Rt, that is, a "write condition detection error $\Delta Rm$", is determined using the following equation (step 134):

$$(\text{write condition detection error } \Delta Rm) = (\text{write condition detection index } Rm) - (\text{target value } Rt) \quad (3)$$

Subsequently, one of the following processes A to C is executed.

A. The write condition detection error $\Delta Rm$ is compared with a write power control threshold Hs (step 135). If the error $\Delta Rm$ is equal to or larger than the threshold Hs, then it can be determined that the "write power is too low to maintain the write condition", so that the write power Pw1 is increased by a write power step width $\Delta Pw$ on the basis of the following equation (step 136).

$$(\text{write power } Pw1) \rightarrow (\text{write power } Pw1) + (\text{write power step width } \Delta Pw) \quad (4)$$

B. The write condition detection error $\Delta Rm$ is compared with a write power control threshold $-Hs$ (step 137). If the error $\Delta Rm$ is equal to or smaller than the threshold $-Hs$, then it can be determined that the "write power is too high to maintain the write condition", so that the write power Pw1 is reduced by a write power step width $\Delta Pw$ on the basis of the following equation (step 138).

$$(\text{write power } Pw1) \rightarrow (\text{write power } Pw1) - (\text{write power step width } \Delta Pw) \quad (5)$$

C. If the conditions do not correspond to the case A or B, that is, $-Hs < \Delta Rm < +Hs$, then the write power Pw1 is not varied.

The operation shown in FIG. 7 is repeated as long as a data write is continued (step 139).

The present invention is not limited to the above embodiment. For example, rather than using the pit reflected light sample hold circuit 18 and the space reflected light sample hold circuit 19, write reflected light may be AD-converted to mathematically determine the quantity of write pit or space reflected light.

Further, Equation 1 or 2 is used to calculate the write condition detection index, and in both equations, the numerator is (write power) 2. Here, the write power may be an alternative that is substantially the same as the write power, that is, a signal corresponding to the write power. For example, if subbeams are used as in the case with an operation push pull method, the quantity of reflected light resulting from front subbeams can be substituted with the write power. Alternatively, the write power may be substituted with a front monitor signal level.

According to the method of calculating a write condition detection index according to the present invention, by using the square of the power Pw1 that is sufficient to generate pit portions, the light intensity level Sp of a stable-intensity portion of light reflected when the disk is irradiated with laser beams with the power Pw1, and the light intensity level Ss of light reflected from a space portion when the disk is irradiated with laser beams with power that is insufficient to generate pit portions, the index Rm is determined on the basis of the equation $$Rm = Sp/Ss/(Pw1)^2$$

or $$Rm = Sp/(Pw1)^2,$$

thereby producing the following effects: The present invention does not use the peak value of the intensity of light reflected when the disk is irradiated with laser beams with the power Pw1, thereby ensuring a stable write condition detection index, which is not affected by a variation in temperature or the like. Further, the use of the square of the power Pw1 serves to increase a variation with respect to the write power, thereby providing a write condition detection index with improved detection sensitivity for the write condition.

According to the optical disk writing method and apparatus according to the present invention, a write condition detection index with improved stability for a variation in temperature and with improved detection sensitivity for the write condition is obtained using the method of calculating a write condition detection index according to the present invention. This index can more appropriately follow a variation in write condition. In other words, the write condition detection index is measured under the optimum write condition as the target value Rt, and the write condition detection index Rm is constantly measured during actual writes to the data area. Then, the write power Pw1 is controlled so as to minimize a difference between the index Rm and the target value Rt, thereby maintaining a stable optimum write condition. That is, always stable and uniform write quality, that is, an optimum β value (asymmetry value), is maintained all over the surface of the optical disk.

The graph in FIG. 2 shows the results of experiments carried out to check the effects of the present invention. In these experiments, to check the effects of the present invention by enabling and disabling the functions according to the present invention using the same environment, data was written to the entire optical disk while alternately enabling and disabling the functions according to the present invention. In this case, when data was written to the entire surface of the optical disk with the write power fixed, that is, without running OPC, then the β value is about 9% smaller at the outer circumference of the disk than at the inner circumference thereof due to a difference in sensitivity within the surface of the optical disk. In contrast, with running OPC according to the present invention, the variation in β value between the inner and outer circumferences is within about ±1%.

Further, the present invention does not use the "peak value of write pit reflected light", which has made measurements with conventional running OPC difficult, thereby avoiding errors in write condition detection index caused by errors in measurement of the peak value of write pit reflected light.

Another problem of the prior art is that with some types of optical disks, as the write power increases, a variation in write condition detection index gradually decreases to saturate the index. In contrast, since the numerator of the equation for the write condition detection index according to the present invention is the "square of the write power", the write power with which the write condition detection index is saturated can be increased to widen the control range compared to the prior art, in which the numerator is the "first power of the write power".

Furthermore, compared to the prior art, in which the numerator of the write condition detection index is the "first power of the write power", the numerator according to the present invention is the "square of the write power", so that the results of the experiments indicate that the write condition detection index according to the present invention can more appropriately follow a variation in write condition as shown in the graph in FIG. 2.

Therefore, according to the present invention, running OPC with good and stable characteristics can be easily realized compared to the conventional running OPC method.

While this invention has been described with reference to illustrative embodiments, this description is not intended to be construed in a limiting sense. Various modifications of the illustrative embodiments as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A method of calculating a write condition detection index, the method determining an index Rm that is indicative of a write condition for an optical disk when information is written to the optical disk, the method comprising the steps of:

A) detecting, as a light intensity level Sp, a stable-intensity portion of light reflected when the disk is irradiated with laser beams with power Pw1 that is sufficient to generate pit portions;

B) detecting, as a light intensity level Ss, the intensity of light reflected from a space portion when the disk is irradiated with laser beams with power that is insufficient to generate pit portions; and C) determining said index Rm using the following equation:

$$Rm = Sp/Ss/(Pw1)^2.$$

2. The method of calculating a write condition detection index according to claim 1, wherein said step C) includes:

determining said index Rm for at least one circumference of said optical disk;

averaging the indices Rm; and setting the average value obtained as a true index Rm.

3. The method of calculating a write condition detection index according to claim 1, the method further comprising the steps of:

detecting said light intensity levels Sp and Ss and said power Pw1 for at least one circumference of said optical disk;

calculating the average of each of the light intensity levels Sp and Ss and power Pw1; and calculating said index Rm using the averages.

4. A method of calculating a write condition detection index, the method determining an index Rm that is indicative of a write condition for an optical disk when information is written to the optical disk, the method comprising the steps of:

A) detecting, as a light intensity level Sp, a stable-intensity portion of light reflected when the disk is irradiated with laser beams with power Pw1 that is sufficient to generate pit portions; and B) determining said index Rm using the following equation:

$$Rm = Sp/(PW1)^2.$$

5. The method of calculating a write condition detection index according to claim 4, wherein said step B) includes:

determining said index Rm for at least one circumference of said optical disk;

averaging the indices Rm; and setting the average value obtained as a true index Rm.

6. The method of calculating a write condition detection index according to claim 4, the method further comprising the steps of:

detecting said light intensity level Sp and said power Pw1 for at least one circumference of said optical disk;

calculating the average of each of the light intensity level Sp and power Pw1; and calculating said index Rm using the averages.

7. A method of writing information to an optical disk by calculating a write condition detection index that is indicative of a write condition for the optical disk when information is written to the optical disk, the method comprising the steps of:

detecting, as a light intensity level Sp, a stable-intensity portion of light reflected when the disk is irradiated with laser beams with power Pw1 that is sufficient to generate pit portions;

detecting, as a light intensity level Ss, the intensity of light reflected from a space portion when the disk is irradiated with laser beams with power that is insufficient to generate pit portions; and determining said index Rm using the following equation:

$Rm = Sp/Ss/(Pw1)^2$;

determining said index Rm for at least one circumference of said optical disk;

averaging the indices Rm;

setting the average value obtained as a true index Rm; and measuring said true index Rm whenever information is written to the optical disk and controlling said power Pw1 so as to minimize a difference between the true index Rm and a target value thereof.

8. The optical disk writing method according to claim 7, further comprising the steps of:

calculating said index Rm during OPC (Optimum Power Calibration) using a method of calculating a write condition detection index; and setting the index Rm as said target value.

9. The optical disk writing method according to claim 7, further comprising the steps of:

calculating said Rm when calibration is executed in a PCA (Power Calibration Area) with optimum write power, using a method of calculating a write condition detection index; and setting the index Rm as said target value.

10. The optical disk writing method according to claim 7, further comprising the steps of:

measuring said index Rm immediately after the start of an actual write to a data area, using said method of calculating a write condition detection index; and setting the index Rm as said target value.

11. A method of writing information to an optical disk by calculating a write condition detection index that is indicative of a write condition for the optical disk when information is written to the optical disk, the method comprising the steps of:

detecting, as a light intensity level Sp, a stable-intensity portion of light reflected when the disk is irradiated with laser beams with power Pw1 that is sufficient to generate pit portions;

detecting, as a light intensity level Ss, the intensity of light reflected from a space portion when the disk is irradiated with laser beams with power that is insufficient to generate pit portions; and determining said index Rm using the following equation:

$Rm = Sp/Ss/(Pw1)^2$;

detecting said light intensity levels Sp and Ss and said power Pw1 for at least one circumference of said optical disk;

calculating the average of each of the light intensity levels Sp and Ss and power Pw1;

calculating said index Rm using the averages; and measuring said index Rm whenever information is written to the optical disk and controlling said power Pw1 so as to minimize a difference between the index Rm and a target value thereof.

12. The optical disk writing method according to claim 11, further comprising the steps of:

calculating said index Rm during OPC (Optimum Power Calibration) using a method of calculating a write condition detection index; and setting the index Rm as said target value.

13. The optical disk writing method according to claim 11, further comprising the steps of:

calculating said index Rm when calibration is executed in a PCA (Power Calibration Area) with optimum write power, using a method of calculating a write condition detection index; and setting the index Rm as said target value.

14. The optical disk writing method according to claim 11, further comprising the steps of:

measuring said index Rm immediately after the start of an actual write to a data area, using said method of calculating a write condition detection index; and setting the index Rm as said target value.

15. A method of writing information to an optical disk by calculating a write condition detection index that is indicative of a write condition for the optical disk when information is written to the optical disk, the method comprising the steps of:

detecting, as a light intensity level Sp, a stable-intensity portion of light reflected when the disk is irradiated with laser beams with power Pw1 that is sufficient to generate pit portions;

determining said index Rm using the following equation:

$Rm = Sp/(Pw1)^2$;

determining said index Rm for at least one circumference of said optical disk;

averaging the indices Rm;

setting the average value obtained as a true index Rm; and measuring said true index Rm whenever information is written to the optical disk and controlling said power Pw1 so as to minimize a difference between the true index Rm and a target value thereof.

16. The optical disk writing method according to claim 15, further comprising the steps of:

calculating said index Rm during OPC (Optimum Power Calibration) using a method of calculating a write condition detection index; and setting the index Rm as said target value.

17. The optical disk writing method according to claim 15, further comprising the steps of:

calculating said index Rm when calibration is executed in a PCA (Power Calibration Area) with optimum write power, using a method of calculating a write condition detection index; and setting the index Rm as said target value.

18. The optical disk writing method according to claim 15, further comprising the steps of:

measuring said index Rm immediately after the start of an actual write to a data area, using said method of calculating a write condition detection index; and setting the index Rm as said target value.

19. A method of writing information to an optical disk by calculating a write condition detection index that is indicative of a write condition for the optical disk when information is written to the optical disk, the method comprising the steps of:

detecting, as a light intensity level Sp, a stable-intensity, portion of light reflected when the disk is irradiated with laser beams with power Pw1 that is sufficient to generate pit portions;

determining said index Rm using the following equation:

$$Rm = Sp/(Pw1)^2;$$

detecting said light intensity level Sp and said power Pw1 for at least one circumference of said optical disk;

calculating the average of each of the light intensity level Sp and power Pw1;

calculating said index Rm using the averages; and measuring said index Rm whenever information is written to the optical disk and controlling said power Pw1 so as to minimize a difference between the index Rm and a target value thereof.

20. The optical disk writing method according to claim 19, further comprising the steps of:

calculating said index Rm during OPC (Optimum Power Calibration) using a method of calculating a write condition detection index; and setting the index Rm as said target value.

21. The optical disk writing method according to claim 19, further comprising the steps of:

calculating said index Rm when calibration is executed in a PCA (Power Calibration Area) with optimum write power, using a method of calculating a write condition detection index; and setting the index Rm as said target value.

22. The optical disk writing method according to claim 19, further comprising the steps of:

measuring said index Rm immediately after the start of an actual write to a data area, using said method of calculating a write condition detection index; and setting the index Rm as said target value.

23. An optical disk write apparatus that determines an index Rm indicative of a write condition for an optical disk in writing information to the optical disk and controls power Pw1 that is sufficient to generate pit portions so as to minimize a difference between the index Rm and a target value thereof, the apparatus comprising:

means for detecting, as a light intensity level Sp, a stable-intensity portion of light reflected when the disk is irradiated with laser beams with said power Pw1;

means for detecting, as a light intensity level Ss, the intensity of light reflected from a space portion when the disk is irradiated with laser beams with power that is insufficient to generate pit portions;

means for determining said index Rm using the following equation:

$$Rm = Sp/Ss/(Pw1)^2; \text{ and}$$

means for controlling said power Pw1 so as to minimize a difference between the index Rm and the target value thereof.

24. An optical disk write apparatus that determines an index Rm indicative of a write condition for an optical disk in writing information to the optical disk and controls power Pw1 that is sufficient to generate pit portions so as to minimize a difference between the index Rm and a target value thereof, the apparatus comprising:

means for detecting, as a light intensity level Sp, a stable-intensity portion of light reflected when the disk is irradiated with laser beams with said power Pw1;

means for determining said index Rm using the following equation $$Rm = Sp/(Pw1)^2;$$

and means for controlling said power Pw1 so as to minimize a difference between the index Rm and the target value thereof.

* * * * *